(12) United States Patent
Zerr et al.

(10) Patent No.: US 6,964,932 B2
(45) Date of Patent: Nov. 15, 2005

(54) SILICON CARBONITRIDE WITH SPINEL STRUCTURE

(76) Inventors: Andreas Zerr, Taubertsberg 2, D-55122 Mainz (DE); Edwin Rolf Balduin Kroke, 1120 W. Lime Ave., Lompoc, CA (US) 93436; Ralf Peter Riedel, Bahnhofstr. 19, D-64832 Babenhausen (DE); Marcus Rolf Schwarz, Wormser Street 11, D-64295 Darmstadt (DE)

( * ) Notice: Subject to any disclaimer, the term of this patent is extended or adjusted under 35 U.S.C. 154(b) by 0 days.

(21) Appl. No.: 10/488,332

(22) PCT Filed: Aug. 27, 2002

(86) PCT No.: PCT/IB02/03455

§ 371 (c)(1),
(2), (4) Date: Sep. 20, 2004

(87) PCT Pub. No.: WO03/018473

PCT Pub. Date: Mar. 6, 2003

(65) Prior Publication Data
US 2005/0031521 A1 Feb. 10, 2005

(30) Foreign Application Priority Data
Aug. 28, 2001 (ZA) ................................ 2001/7105

(51) Int. Cl.⁷ ...................... C04B 35/515; C01B 21/082
(52) U.S. Cl. ........................ 501/87; 501/92; 501/96.1; 501/96.5; 423/345; 423/371
(58) Field of Search ................ 1/87, 92, 96.1; 501/87, 92, 96.1, 96.5; 423/345, 371

(56) References Cited

U.S. PATENT DOCUMENTS

| 4,568,614 A | 2/1986 | Eichen et al. |
| 5,935,705 A * | 8/1999 | Chen et al. ................. 428/367 |
| 6,090,358 A | 7/2000 | Chen et al. |

FOREIGN PATENT DOCUMENTS

| DE | 197 24 938 A1 | 12/1998 |
| EP | 0 826 628 A1 | 3/1998 |

OTHER PUBLICATIONS

W.Y. Ching, et al., Physical Review B, vol. 63, No. 6, Jan. 17, 2001, pp. 1–4.
Riedel R., et al., Chemistry of Materials, American Chemical Society, Washington, U.S., vol. 10, No. 10, Oct. 1, 1998, pp. 2964–2979.
Riedel R., et al., Angewandte Chemie, VCH Verlagsgesellschaft, Weinheim, Germany, vol. 36, No. 6, 1997, pp. 603–606.

* cited by examiner

*Primary Examiner*—Karl Group
(74) *Attorney, Agent, or Firm*—Scully, Scott, Murphy & Presser

(57) ABSTRACT

A compound having a space spinel structure and the formula $Si_{3-x} C_x N_4$ wherein $0<x\leq1$. An example of the compound is spinel silicon carbonitride. The compound of the invention may be made by providing a silicon carbo-diimide compound and subjecting the compound to elevated temperature and pressure conditions.

12 Claims, No Drawings

SILICON CARBONITRIDE WITH SPINEL STRUCTURE

BACKGROUND OF THE INVENTION

This invention relates to a hard material.

Ultra-hard materials may be defined as those materials which have a Vickers pyramid hardness greater than 40 GPa. Examples of such materials which currently find extensive use in industry are diamond and cubic boron nitride. These two ultra-hard materials are not suitable for all applications, despite their hardness. For examples, diamond is a poor abrasive for many iron materials as iron tends to react chemically with the diamond under abrasive conditions. There is thus a need for an ultra-hard material with a chemical composition different from that of diamond and cubic boron nitride. The literature contains references to theoretical predictions and suggestions as to such materials.

SUMMARY OF THE INVENTION

According to a first aspect of the invention, there is provided a compound having a spinel structure and the formula:

$$Si_{3-x}C_xN_4 \text{ wherein } 0<x\leq 1 \tag{1}$$

A spinel structure, as is known in the art, has the space group Fd3m (International Tables for X-ray Crystallography 1952, pages 340 and 341).

According to another aspect of the invention, there is provided a compound of the formula (1) for use in an abrasive, tribological, thermal, optical, dielectric, electronic and/or optoelectronic application.

According to yet another aspect of the invention, there is provided a method of making a compound of formula (1) which includes the steps of providing a silicon carbo-diimide compound and subjecting the compound to elevated temperature and pressure conditions to convert the silicon carbo-diimide into a compound of the formula (1).

DESCRIPTION OF EMBODIMENTS

The invention provides a compound of formula (1) having a spinel structure and which is an ultra-hard crystalline material having a hardness greater than 40 GPa. Thus, the material has particular use as an abrasive in applications such as grinding, cutting, milling, boring and as a wear surface. Furthermore, the material has a high conductivity and has a low dielectric constant and thus has use as a dielectric passivation layer in electronic devices. The material has semi-conductor properties and has use in active electronic and optoelectronic devices.

The compounds of formula (1) may be doped with other elements. Thus, some of the silicon, which is located at 16d* site within the spinel structure, can be substituted by heavier atoms of groups IVa and IVb of the Periodic Table, e.g. germanium, tin, lead, titanium, zirconium and hafnium. Typically, such an atom or element, when it occupies a silicon site, will be present in an amount up to 12 percent by number of silicon sites. The dopant may also be an element such as oxygen which will occupy an anion site located at 32e*. When the element occupies an anion site, then the element will typically be present in an amount of up to 9 percent by number of anion sites. A resulting charge deficiency will be counteracted by cation vacancies. [* Wyckhoff notation, see International Tables of Crystallography (1952), p. 340 and 341].

The strongly covalent nature of the C—N bonding in the compound of the invention enhances the hardness of the material. Further, it is believed that the compound is protected from oxidation by a passive $SiO_2$ layer on its surface.

The compounds of formula (1) may be produced by a method which involves converting a silicon carbo-diimide compound under elevated temperature and pressure conditions for the desired compound. The elevated pressure will typically be greater than 10 GPa and the elevated temperature will typically be greater than 1000° C.

The silicon carbo-diimide starting material may be a silicon (carbo-diimide) nitride, described by the formula $Si_6N_{8-2x}[N{=}C{=}N]_{3x}$ wherein $0<x<1$, or the crystalline phase, $Si_2N_2[N{=}C{=}N]$. The last-mentioned compound is the preferred starting material. These starting materials may be produced by a method described in Reference 1 or by a variation of such method.

When the compound produced is doped with a metal in a cation site it is preferred that the element be introduced into the starting material before the conversion step. Similarly, if the compound produced is one with an element such as oxygen in an anion site, the element is again preferably introduced into the starting material before the conversion step.

The invention will now be illustrated by the following examples.

EXAMPLES

Example 1

Spinel Silicon Carbonitride ($Si_2CN_4$) from Silicon (Carbo-diimide) Nitride

A multi-anvil high-pressure apparatus equivalent to the one described, for example, by Rubie (Reference 2) and Walter (Reference 3) was used in this example.

Silicon (carbo-diimide) nitride, produced according to the method described in Reference 1, was ground to a powder in inert gas, placed into a precious metal pipe (Re or PT, diameter: 1.5–1.7 mm, height: 2.7 mm) and compressed along one axis with a plunger. The precious metal pipe was sealed airtight and placed in an octahedral pressure transfer container made of MgO (length of edges 10 mm). Concentrically, around the sample was an electrical insulation layer of hexagonal BN, a heating unit made of $LaCrO_3$ and a $ZrO_2$ pipe. The temperature was measured by means of a $W_{97}Re_3$—$W_{75}Re_{25}$ thermocouple that had been coaxially inserted into the heating unit. An MgO octahedron containing the sample was placed between 8 hard-metal cubes (25 mm length of edges 8 mm) and compressed within a hydraulic press. The pressure inside the sample configuration was correlated with the hydraulic pressure of the press via phase transitions. The pressure applied to the sample was 18±1 GPa.

The sample, under the pressure indicated above, was heated for 15 minutes to a temperature of 1800° C., held there for 20 minutes and cooled to 100° C. in 1.5 minutes by switching off the heating. After decompression, the sample material appeared as a solid, colourless, opaque body. Analysis with micro Taman spectroscopy and X-ray powder diffractometry did not detect any phases apart from the precious metal used for encapsulation and c-$Si_2CN_4$, i.e. spinel $Si_2CN_4$.

Example 2

Spinel Silicon Carbonitride from Silicon (Carbo-diimide) Nitride with Oxygen Doping Silicon tetrachloride and bis-(trimethyl-silyl)-carbo-diimide with catalytic amounts of pyridine were converted to the corresponding silicon carbo-diimide starting material according to the method described in Reference 1. The generated trimethyl-chlorosilane was removed via distillation. The raw material thus produced was filled under inert gas into a combustion boat made of quartz glass and calcined in a quartz pipe in vacuum at 350° C. in vacuum to remove the remaining gases and solvent traces. The quartz pipe was subsequently flooded with air instead of argon. After 30 minutes (at an air humidity of 17%) the material was heated in an argon stream of 2 cm$^3$/min and 100 K/h to 960° C. After 5 minutes the material was left to cool to room temperature. The cyanamide that was generated through hydrolysis by the humidity of the air was removed during the heating phase and condensed in the cooler part of the quartz pipe. The silicon (carbo-diimide) nitride produced this way had a relatively high oxygen content (approximately 4.5% mass according to ultimate analysis). The white product was ground and homogenised with an agate mortar in inert gas and introduced into the MgO pressure transfer container as described in Example 1. The approximate elemental composition in the produced spinel silicon carbonitride was determined with electron probe micro-analysis (EPMA). The values are given in percent by mass: Si 46%, C 8%, N 41%, O 5%.

Example 3

Spinel Silicon Carbonitride from Silicon (Carbo-diimide) Nitride Doped with 1% Atom Titanium A mixture of silicon and titanium tetrachloride in a mass ratio of 98.3:1.7 with bis-(trimethyl-silyl)-carbo-diimide and catalytic amounts of pyridine was converted to the corresponding silicon titanium carbo-diimide according to the method described in reference 1. Via appropriate temperature treatment, which is also described in Reference 3, this material was converted to silicon titanium (carbo-diimide) nitride with the composition $Si_{1.98}Ti_{0.002}CN_4$. The conversion of this material to the Ti-doped c-$Si_2CN_4$ was carried out as described in Example 1. A lower pressure of 15 GPa was applied.

Example 4

Spinel Silicon Carbonitride with Increased Silicon Content

Silicon tetrachloride with a mixture of bis-(trimethyl-silyl)-carbo-diimide and bis-(trimethyl-silyl)-amine in a mass ratio of 85:15 with catalytic amounts of pyridine was converted to the corresponding silicon (carbo-diimide) nitride according to the method described in Reference 1. The generated trimethyl-chlorosilane was removed via distillation. This is described by the idealised equation below:

$$2.4 SiCl_4 + 2.8((CH_3)_3Si)_3N + 0.6(CH_3)_3Si-N=C=N-Si(CH_3)_3 \xrightarrow{pyridine\ (catalyst)} Si_{2.4}C_{0.6}N_4 \downarrow 9.6(CH_3)_3SiCl\uparrow$$

The silicon (carbo-diimide) nitride was calcined as in Example 2, but without allowing exposure to air. The conversion of the resulting product to a compound with the approximate composition $Si_{2.4}C_{0.6}N_4$ having the spinel structure was carried out as described in Example 1. A lower pressure of 15 GPa was applied.

Example 5

Spinel Silicon Carbonitride Using Shockwave

The process set out in Example 1 was repeated, save that the elevated temperature and pressure conditions applied were a temperature of 1200° C. and a pressure of 20 GPa. These conditions were maintained for a period of 15 minutes. A hard product was produced and was believed to be spinel $Si_2CN_4$.

References

1. R. Riedel, A. Greiner, G. Miehe, W. Dressler, H. Fuess, J. Bill, F. Aldinger; Angew. Chem. Int. Ed. Engl. (1997), 36, 603–606.
2. D. C. Rubie; Phase Transitions (1999), 68, 431–451.
3. M. J. Walter, Y. Thibault, K. Wei, R. W. Luth; Can. J. Phys. (1995), 73, 273–286.

What is claimed is:

1. A compound having a spine structure and the formula: $Si_{3-x}C_xN_4$ wherein 0<x.
2. A compound according to claim 1 which is doped with another element.
3. A compound according to claim 2 wherein the dopant element substitutes some of the silicon.
4. A compound according to claim 3 wherein the dopant element is an atom of group IVa and IVb of the Periodic Table.
5. A compound according to claim 4 wherein the atom is selected from germanium, tin, lead, titanium, zirconium and hafnium.
6. A compound according to claim 3 wherein the dopant occupies a silicon site and is present in an amount of up to 12% by number of silicon sites.
7. A compound according to claim 2 wherein the dopant element is oxygen and occupies an anion site.
8. A compound according to claim 7 wherein the oxygen is present in an amount of up to 9% by number of anion sites.
9. A method of making a compound of claim 1 which includes the steps of providing a silicon carbo-diimide compound and subjecting the compound to elevated temperature and pressure conditions to convert the silicon carbo-diimide into said compound.
10. A method according to claim 9 wherein the elevated pressure is greater than 10 GPa and the elevated temperature is greater than 1000° C.
11. A method according to claim 9 wherein the silicon carbo-diimide is a silicon (carbo-diimide) nitride having the formula $Si_6N_{8-2x}[N=C=N]_{3x}$ wherein 0<x<1.
12. A method according to claim 9 wherein the silicon carbo-diimide is a silicon (carbo-diimide) nitride having the formula $Si_2N_2[N=C=N]$.

* * * * *